(12) United States Patent
Haynes

(10) Patent No.: US 12,061,898 B2
(45) Date of Patent: Aug. 13, 2024

(54) ROBUST FIRMWARE AND CONFIGURATION UPDATE OVER NETWORK

(71) Applicant: Aclara Technologies LLC, St. Louis, MO (US)

(72) Inventor: David Donald Haynes, St. Peters, MO (US)

(73) Assignee: Aclara Technologies LLC, St. Louis, MO (US)

( * ) Notice: Subject to any disclaimer, the term of this patent is extended or adjusted under 35 U.S.C. 154(b) by 359 days.

(21) Appl. No.: 17/203,458

(22) Filed: Mar. 16, 2021

(65) Prior Publication Data

US 2021/0294595 A1    Sep. 23, 2021

Related U.S. Application Data

(60) Provisional application No. 62/991,370, filed on Mar. 18, 2020.

(51) Int. Cl.
    *G06F 8/658* (2018.01)
(52) U.S. Cl.
    CPC .................... *G06F 8/658* (2018.02)
(58) Field of Classification Search
    CPC ................... G06F 8/658; G06F 8/65
    USPC ........................................ 717/172
    See application file for complete search history.

(56) References Cited

U.S. PATENT DOCUMENTS

| | | |
|---|---|---|
| 2005/0144437 A1 | 6/2005 | Ransom et al. |
| 2006/0258344 A1 | 11/2006 | Chen |
| 2008/0163189 A1 | 7/2008 | Chen et al. |
| 2010/0325523 A1* | 12/2010 | Slyz et al. ............. G06F 8/65 714/773 |
| 2012/0029850 A1 | 2/2012 | Kagan |
| 2014/0007069 A1 | 1/2014 | Cavalaris et al. |
| 2017/0039372 A1 | 2/2017 | Koval et al. |
| 2019/0034196 A1* | 1/2019 | Pirvu et al. ........... G06F 8/65 |
| 2020/0012488 A1* | 1/2020 | Koval et al. .......... G06F 8/65 |
| 2020/0233811 A1* | 7/2020 | Hall ....................... G06F 8/65 |

FOREIGN PATENT DOCUMENTS

EP    2 661 050 A1    11/2013

OTHER PUBLICATIONS

Wang et al. "Confirm: Detecting firmware modifications in embedded systems using hardware performance counters." 2015 IEEE/ACM International Conference on Computer-Aided Design (ICCAD). IEEE, 2015. Nov. 6, 2015. Retrieved on May 18, 2021 from <https://ieeexplore.ieee.org/abstract/documents/7372617>.
PCT/US2021/022774 International Search Report and Written Opinion dated Jun. 11, 2021 (14 pages).
European Search Report dated Mar. 25, 2024 for corresponding European Application No. 21772228.9.

* cited by examiner

*Primary Examiner* — Wei Y Zhen
*Assistant Examiner* — Mohammed N Huda
(74) *Attorney, Agent, or Firm* — Michael Best & Friedrich LLP

(57) ABSTRACT

A method of adaptably allowing an upgrade to firmware or a configuration of target endpoint hardware to be at least one of replaced or modified by way of instructions generated by a patch generator and executed by target endpoint hardware to generate an upgrade file, install the upgrade file, and audit the installation of the upgrade file is disclosed.

11 Claims, 5 Drawing Sheets

ROBUST FIRMWARE AND CONFIGURATION UPDATE OVER NETWORK

CROSS-REFERENCE TO RELATED APPLICATION

This application claims the benefit of U.S. Provisional Application Ser. No. 62/991,370, filed Mar. 18, 2020, the entire contents of this document are hereby incorporated by reference herein.

BACKGROUND

The present disclosure relates to a method of applying upgrades to target endpoint hardware that may comprise at least one of a plurality of possible endpoint systems in a power distribution network, wherein each of the plurality may require a different file type for the upgrades.

In the field of metrology, legacy firmware download processes supported only firmware downloads to a local network interface card (NIC). However, this is not the only component in a meter. The metrology board may also be equipped with a microprocessor which may require firmware. Other collections of data are also large enough in size that they might be best handled in collective form as a file. Meter configurations (often called the meter "program") may be one such occasion. An improved download process has grown in capability to support multiple file types—not just NIC firmware. A corresponding growth in instruction processing capability is thus disclosed. The disclosed methods and products may be utilized as part of a larger process which is described alongside a description of particular novel improvements to the meter update process.

Data produced by a meter technician using a meter tool may describe a desired meter configuration. However, the ability to support the transfer of meter configuration data, and the protocols to do so, are also needed. A new protocol is described which transmits data originally found in the data produced by the meter tool in the form of instructions to the NIC. The instructions transmitted to the NIC may instruct the NIC to confirm the compatibility of the proposed configuration, instructions on how to write the configuration to a meter, and instructions on how to audit the outcome.

Among other features disclosed herein, the transfer of meter firmware over a network is a new capability. Additionally, modification of an old schema, such as but not limited to an XML schema, to carry the meter firmware image alongside other commands required to install the image in the meter is considered new as well. A modified schema that was originally designed to carry meter configurations and that may now also carry firmware images is described.

SUMMARY

In one aspect, a method for a robust, adaptive, approach to updating endpoint systems with configuration or firmware updates is disclosed. In the event that a network interface card (NIC) has access to a current state of a target endpoint, an image of a desired endpoint system state may be compared to an image of the present endpoint system state, and a patch generator may be used to translate the result of that comparison to a set of instructions interpretable by the NIC that represents the difference between the two states. When the NIC executes these instructions, the NIC may be able to recreate the desired endpoint system state within the target endpoint system by creating a file constructed and arranged for that goal, as a result of executing the aforementioned instructions. This file may then be transferred to the target endpoint system by the NIC. If, however, it is the case that the NIC does not have access to the current state of the target endpoint system, the NIC may be unable perform the aforementioned comparison due to the unavailability of the current state of the endpoint system and may be unable build a suitable update file.

In such a case, the default instruction to the NIC may be simply to load the image of the desired state of the target endpoint. Additionally, in such a case, the patch generator may provide instructions to the NIC regarding what the NIC must do when corresponding with the target endpoint system in order to vet the sustainability of the desired update, to apply the update, and to audit the results of the update. Further, the target endpoint system may notify the network interface card of whether the update was successfully applied.

In the case that the endpoint system is a metrology board (referred to herein simply as "meter"), the update file that is built, applied, and verified may be a file such as but not limited to meter firmware or a meter configuration. In the case that the endpoint system is the network interface card, the file that is built, applied, and verified may be a file such as but not limited to network interface card firmware. This process can be extended to provide custom, detailed upgrade instructions to the NIC to perform updates to any device to which it is connected.

In another independent aspect, a secure and adaptable patch generator receives an image of a desired state of an endpoint system ("desired firmware image" as well as an image of the present state of the endpoint system and compares the two images. In comparing the two images, the patch generator determines a set of instructions, readable by a network interface card, that instruct the network interface card to build an upgrade file that is calculated to cause the endpoint system to modify itself so that it mirrors desired firmware image. This upgrade file may then be delivered to target endpoint hardware, and the target endpoint hardware may respond to the receipt of the upgrade file, and may also notify the network interface card that the update file received was successfully applied.

In yet another independent aspect, a number of work instructions may be provided to a patch generator for the purpose of generating a set of file-building instructions for an endpoint system. The work instructions may be in the form of XML and may be accompanied by a set of scripted instructions which may induce the NIC to build a target endpoint hardware upgrade file for the installation on the target endpoint hardware. The scripted instructions may be in the form of binary instruction and may induce the NIC to do at least one of, (a) test the target endpoint system for compatibility, (b) process the details of the transfer, and (c) audit the results. These scripted instructions may also be digitally signed as well as protected by a CRC.

Other aspects of the disclosure will become apparent by consideration of the detailed description and accompanying drawings.

Figure 1:
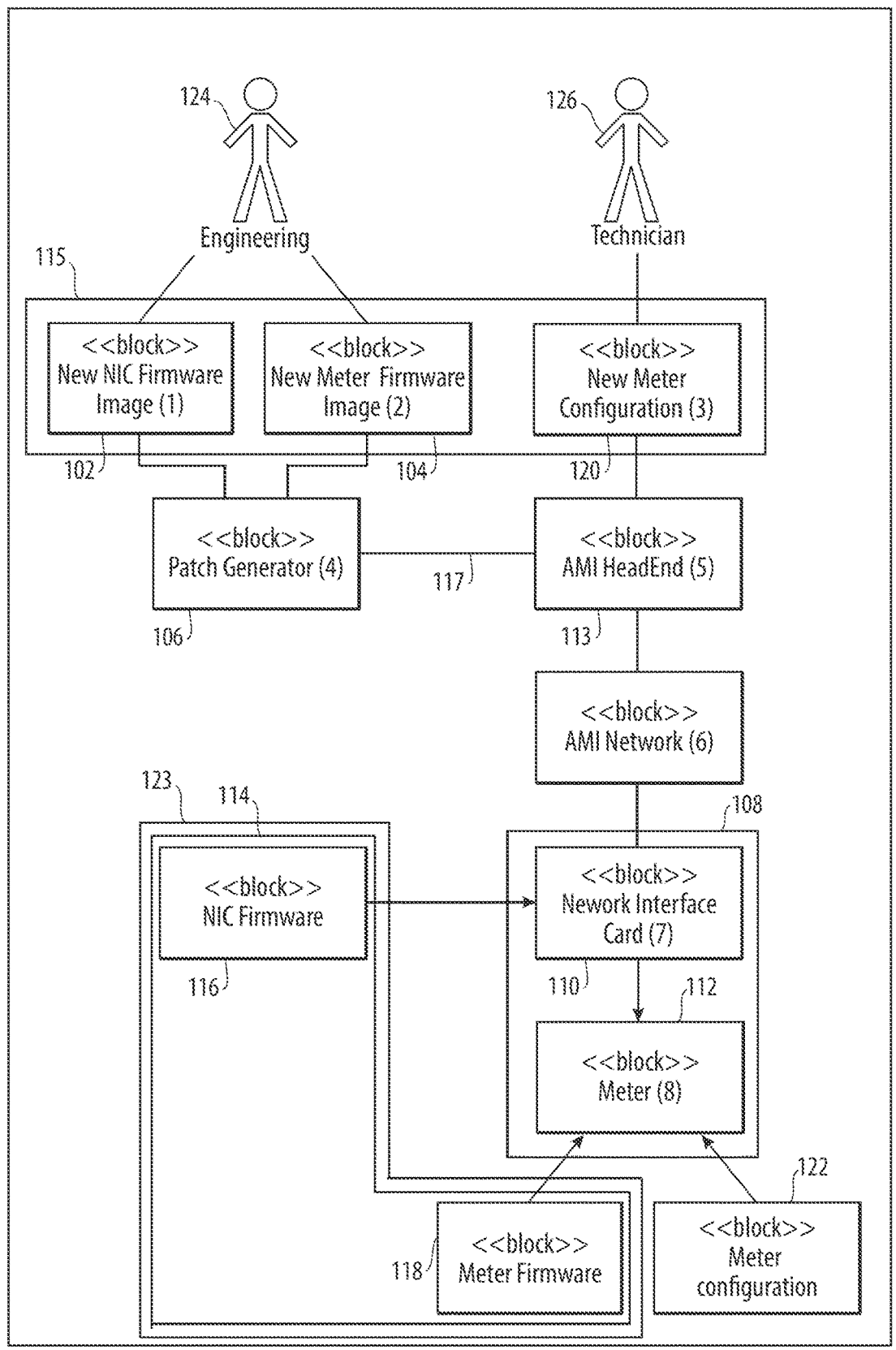
FIG. 1 is a diagram depicting the flow of information and data from systems within an RF network according to a number of aspects.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it we stated in this document that "item Z may comprise element A or B," this may be interpreted to disclose an item Z comprising only element A, an item Z comprising only element B, as well as an item Z comprising elements A and B. As used herein "line" may refer to a curved line as well as a straight line.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

A power distribution network may comprise at least one headend in wired or wireless communication with a plurality of items of endpoint hardware such as network interface cards (NIC) and meters via the network. The headend may be a server located in an automated metering infrastructure (AMI) network related to the power distribution network. NICs may be configured, according to firmware installed on each NIC, to communicate wirelessly or over a wire with at least one meter, and act as an intermediary between a meter and a headend. Additionally, in some cases, the headend or meter may be configured to communicate directly with one another over a wired or wireless connection. Meters, such as power meters, may be numerous in the power distribution network and function according to meter firmware and a meter configuration installed on each meter. In some cases, an NIC is configured to perform tasks related to a connected meter and delegated to the NIC by a headend to which the NIC is connected. By way of this delegation, work may be accomplished on a large number of meters in response to an instruction broadcast, multicast, or transmitted from single headend. A headend may be instrumental in delegating the application of endpoint hardware upgrades, and may itself have certain capabilities and configurations that disallow it from indiscriminately accepting all file-types as endpoint hardware upgrade files. An upgrade file may include items such as but not limited to a firmware image, a hardware configuration, or work instructions—these items will be described in further detail, below. Endpoint hardware may vary in capability and configuration such that differing types of upgrade files may be required for applying an update to differing pieces of endpoint hardware. For example, it may be the case that a headend only accepts input files in a particular XML format. In such a case, files intended to be used as endpoint hardware upgrade files may need to be converted into the particular XML that the headend uses when communicated to the headend-a patch generator may be used for this conversion. In some cases, the upgrade file may be generated by a tool such as but not limited to a patch generator for any component of a piece of target endpoint hardware such as but not limited to a NIC, a metrology board, a radio transmitter, a disk drive, a tape drive, a solid state drive, DRAM, RAM, a cellular transceiver, a GPS unit, or any other known component that might be used in a metering system that could require a firmware update.

As shown in FIG. 1, an endpoint hardware firmware image 101 including a NIC firmware image 102 or a meter firmware image 104 may be provided as or in an upgrade file 115 to a patch generator 106 along with an indication of endpoint hardware that is the target of the upgrade (target endpoint hardware 108) such as a network interface card 110 or a meter 112. The patch generator 106 may query the target endpoint hardware 108 for the current version or state of the firmware installed thereon. In some cases, this query may be communicated through the headend 113, or originate at the headend 113. The patch generator 106 may then compare any firmware image provided as or in the upgrade file 115 with any available firmware image installed on a piece of target endpoint hardware 108. On the basis of this comparison, the patch generator 106 may produce a number of upgrade instructions 117, such as file-building instructions, for the headend 113 to communicate to the target endpoint hardware 108, and for the target endpoint hardware 108 to execute. These upgrade instructions 117 may be produced by the patch generator 106 in a format that is suitable for broadcast, unicast, or multicast to at least one piece target endpoint hardware 108 such as an NIC 110 or a meter. If the target endpoint hardware 108 executing the upgrade instructions 117 is a meter, the meter may reconfigure itself based on the upgrade instructions 117. If the target endpoint hardware 108 executing the upgrade instructions 117 is a NIC 110, the NIC 110 creates an endpoint hardware upgrade file 115 for the target endpoint hardware 108 and causes it to be installed on the target endpoint hardware 108, thereby causing the target endpoint hardware firmware installation 114 or target endpoint hardware configuration file 122 of the target endpoint hardware 108 to mirror a desired endpoint hardware state—for example, a state of the target end point hardware 108 wherein the received endpoint hardware upgrade file 115 is successfully installed. In such cases, the upgrade instructions 117 may also be accompanied by scripted instructions for an NIC 110 to do at least one of test the target NIC 110 or meter 112 for compatibility, process the details of the transfer, and audit the results. The upgrade instructions 117 may also be digitally signed as well as protected by a CRC as part of being processed by the patch generator 106.

The NIC firmware image 102 or meter firmware image 104 may be prepared by a governing source 124 such as but not limited to an engineering department or a similar source of firmware upgrades. In some cases, the governing source 124 may instruct the headend 113 to prepare an upgrade file 115 for completely overwriting or replacing the target endpoint hardware firmware installation 114. In a similar vein, the governing source 124 may prepare work instructions (not shown) that cause the patch generator 106 to generate a set of upgrade instructions 117 for the NIC 110. In such cases, the work instructions may be contained in a schema such as XML, but may also come in other formats such as a scripting language or machine language. The patch generator 106 may generate binary upgrade instructions 117 for the NIC 110 based on the work instructions, packetize the upgrade instructions 117 and communicate the upgrade instructions 117 to the NIC 110. Additionally, the governing source 124 may prepare XML suitable for the headend 113, the XML containing components configured to cause a piece of target endpoint hardware 108 to facilitate an upgrade in a fashion described above. In such a case, the governing source 124 may communicate this XML directly to the headend 113.

As shown in FIG. 1, a target endpoint hardware 108 configuration may also be communicated as an upgrade file 115 by a technician 126 to the patch generator 106. The endpoint hardware configuration may be in the form of a schema such as but not limited to an XML schema contained in an endpoint hardware configuration file 122. Such an endpoint hardware configuration file 122 may be communicated by a technician or other source to a patch generator 106. Upon receiving the endpoint hardware configuration file 122, the patch generator 106 may process the endpoint hardware configuration file 122 by at least one of adding file descriptor metadata, adding a digital signature, or producing instructions representing the desired transfer to the target endpoint hardware 108. The processed target endpoint hardware configuration file 122 may then be communicated by the patch generator 106 to a NIC 110 for the purpose of transfer to and installation at the target endpoint hardware 108 in a suitable fashion as dictated by the data included in the processed target endpoint hardware configuration file 122.

The patch generator 106 may accept as an upgrade file 115 items such as but not limited to a file comprising an NIC firmware 116, meter firmware 118, or a file comprising a meter configuration 120. Based on the upgrade file 115 accepted as input, the patch generator 106 may be configured to add file descriptor metadata and add a digital signature to the upgrade file 115, and produce upgrade instructions 117 such as but not limited to an XML file detailing a sequence for a transfer of a compatible file for effectuating the desired upgrade to the target endpoint hardware 108. For example, embedded within the upgrade instructions 117 file may be a data file which contains instructions to the NIC 110, which if executed, will build an appropriate target endpoint hardware upgrade file 123, install the target endpoint hardware upgrade file 123 to the target endpoint hardware 108, and verify the installation of the target endpoint hardware upgrade file 123. The contents of the target endpoint hardware upgrade file 123 may be in a format which varies according to the type of the upgrade instructions 117 or the compatibility of the target endpoint hardware 108. For example, the upgrade instructions 117 may be an executable binary file, and the target endpoint hardware upgrade file 123 may be a datagram.

The upgrade instructions 117 may also be held in memory or storage at the headend 113 where a user such as but not limited to a technician 126 can select it for use. Once selected, the upgrade instructions 117 may be packetized. Packetization may involve breaking the upgrade instructions 117 up into manageable packets 127 which may be individually numbered, made transmittable to a piece of target endpoint hardware 108, and put in an acceptable format for reception by a piece of target endpoint hardware 108. The headend 113 may guide the user to identify target endpoint hardware 108 that is suitable to receive the upgrade to be effectuated by the execution of the upgrade instructions 117, and at the user's discretion, initializes a download at an item of target endpoint hardware 108. The packets 127 may then be unicast, broadcast, or multicast to target endpoint hardware 108 such as but not limited to a NIC 110 or a meter. The headend 113 may then either receive a message from the target endpoint hardware 108 confirming at least one of the completion of the transfer of the upgrade instructions 117. In light of this confirmation, the user may commit to the application of the upgrade to the target endpoint hardware 108 by execution of the upgrade instructions 117 received by the target endpoint hardware 108. Based upon the user's committal to the application of the upgrade, the target endpoint hardware 108 may confirm the suitability of the upgrade type and generate a target endpoint hardware upgrade file 123 based on the upgrade instructions 117. For example, if a meter is the target endpoint hardware 108, an NIC 110 may act as intermediary hardware by receiving the transmitted upgrade instructions 117, confirming that the meter 112 is compatible with the upgrade to be effectuated by the upgrade instructions 117, and executing the upgrade instructions 117 to produce a target endpoint hardware upgrade file 123 for installation on the meter 112.

Continuing with this example, and as can be seen from FIG. 1, after generating a target endpoint hardware upgrade file 123, the NIC 110 may communicate the target endpoint hardware upgrade file 123 to target endpoint hardware 108, such as a meter 112. The target endpoint hardware 108 may then install the target endpoint hardware upgrade file 123. After installing the target endpoint hardware upgrade file 123, the target endpoint hardware 108 may communicate with the NIC 110 in order to notify it, through the network to which the NIC 110 is connected, that the target endpoint hardware upgrade file 123 was or was not successfully received and installed. In addition, the NIC 110 may be used to audit the installation of the target endpoint hardware upgrade file 123 by the target endpoint hardware 108 by methods such as but not limited to determining that the file size of a firmware image of the upgraded target endpoint hardware 108 matches the file size of the upgrade file 115 or the target endpoint hardware upgrade file 123. If the NIC 110 determines that the upgrade to the target endpoint hardware 108 did not occur correctly, the NIC 110 may respond by taking action such as but not limited to retransferring the target endpoint hardware upgrade file 123. For example, if packets 127 are dropped during this process or missing, the target endpoint hardware 108 may communicate this fact to the headend 113. The headend 113 may then ask the target endpoint hardware 108 to identify the missing packets 127 by number. The missing packets 127 may then be rebroadcast or multicast by the headend 113. This process may repeat until the user, the target endpoint hardware 108, or the headend 113 is satisfied with the success.

In a number of embodiments, the NIC 110 may itself be the target endpoint hardware 108 and therefore the target of the target endpoint hardware upgrade file 123. In such cases, the NIC 110 may install the target endpoint hardware upgrade file 123 on itself, thereby modifying itself to mirror the image of the desired state of the target endpoint hardware 108. Upon a successful install of the target endpoint hardware upgrade file 123, the NIC 110 may communicate an indication of the successful install to the headend 113.

In some cases, the patch generator 106 determines the compatibility or capabilities of the target endpoint hardware 108 before generating upgrade instructions 117. In certain cases, this determination is made by the headend 113 and communicated by the headend 113 to the patch generator 106. If information about the target endpoint hardware 108 firmware is not available, the patch generator 106 may directly communicate a firmware image file reflecting a desired endpoint hardware state to the target endpoint hardware 108 rather than generating upgrade instructions 117. Communicating a firmware image itself rather than upgrade instructions 117 may still involve the patch generator 106 transforming the firmware image into a schema digestible by the headend 113, and the headend 113 packetizing and communicating the packets 127 to the target endpoint hardware 108.

As additionally shown in FIG. 1, and as alluded to above, the target endpoint hardware upgrade file 123 may include an endpoint hardware configuration file such as a meter configuration 120 detailing a desired meter configuration. The endpoint hardware configuration may be a layer that sits on top of the firmware of the target endpoint hardware 108. A meter configuration 120 may include settings pertaining to device type, group information, logging practices, and so forth. For example, in the case of a meter 112, a meter configuration 120 may include settings such as meter type, language settings, meter group name, meter rollover handling settings, etc.

In some embodiments related to FIG. 1, a meter base files (not shown) may be communicated directly to a meter 112 by any of the processes or methods described above. The base file may be configured to update a configuration of peripheral devices comprising the meter. For example, when a base file is installed on a meter 112, it may cause a display screen, such as an LCD screen, to display data in an updated manner according to the base file.

Figure 2:
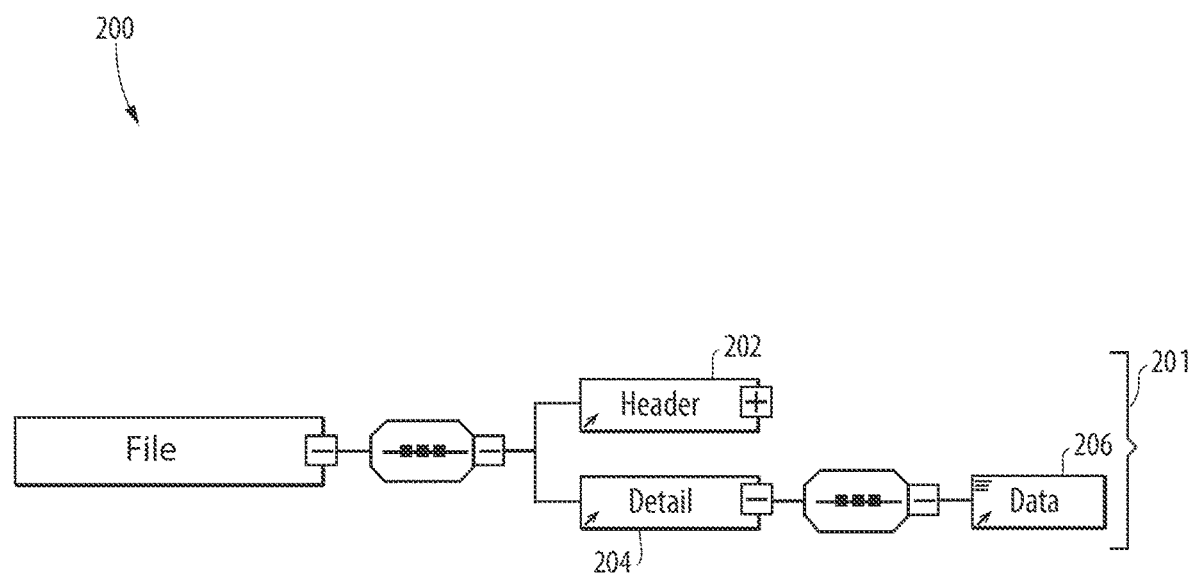
FIG. 2 depicts a generalized schema received by a head-end according to a number of aspects.

As shown in FIG. 2, a schema 200 including data and details pertinent to a desired target endpoint hardware 108 upgrade may be received by a headend 113 according to a number of aspects. As alluded to above, the schema 200 may contain a set of work instructions 201 from a source such as a meter tool of a power network technician 126. The schema 200 may also contain output from a patch generator 106, the output resulting from an upgrade file 115 being provided to the patch generator 106 by a governing source 124 such as a development or engineering team. A header portion 202 of the work instructions 201 may contain items such as but not limited to compatibility information, metadata, security information, audit information, authentication information, or format information for creating and installing the desired upgrade. A detail portion 204 of the instructions may comprise the technical underpinnings of the upgrade to be effectuated by the execution of the work instructions 201. Additionally, the work instructions 201 may include relevant accompanying data 206 pertaining to what changes to the current state of the target endpoint hardware 108 should be made in order to cause the target endpoint hardware 108 to effectuate the upgrade. This schema 200 may be further processed by intermediary hardware such as an NIC 110, or may be delivered directly to the target endpoint hardware 108, which in some cases may be the NIC 110 or a meter 112, for installation.

Figure 3:
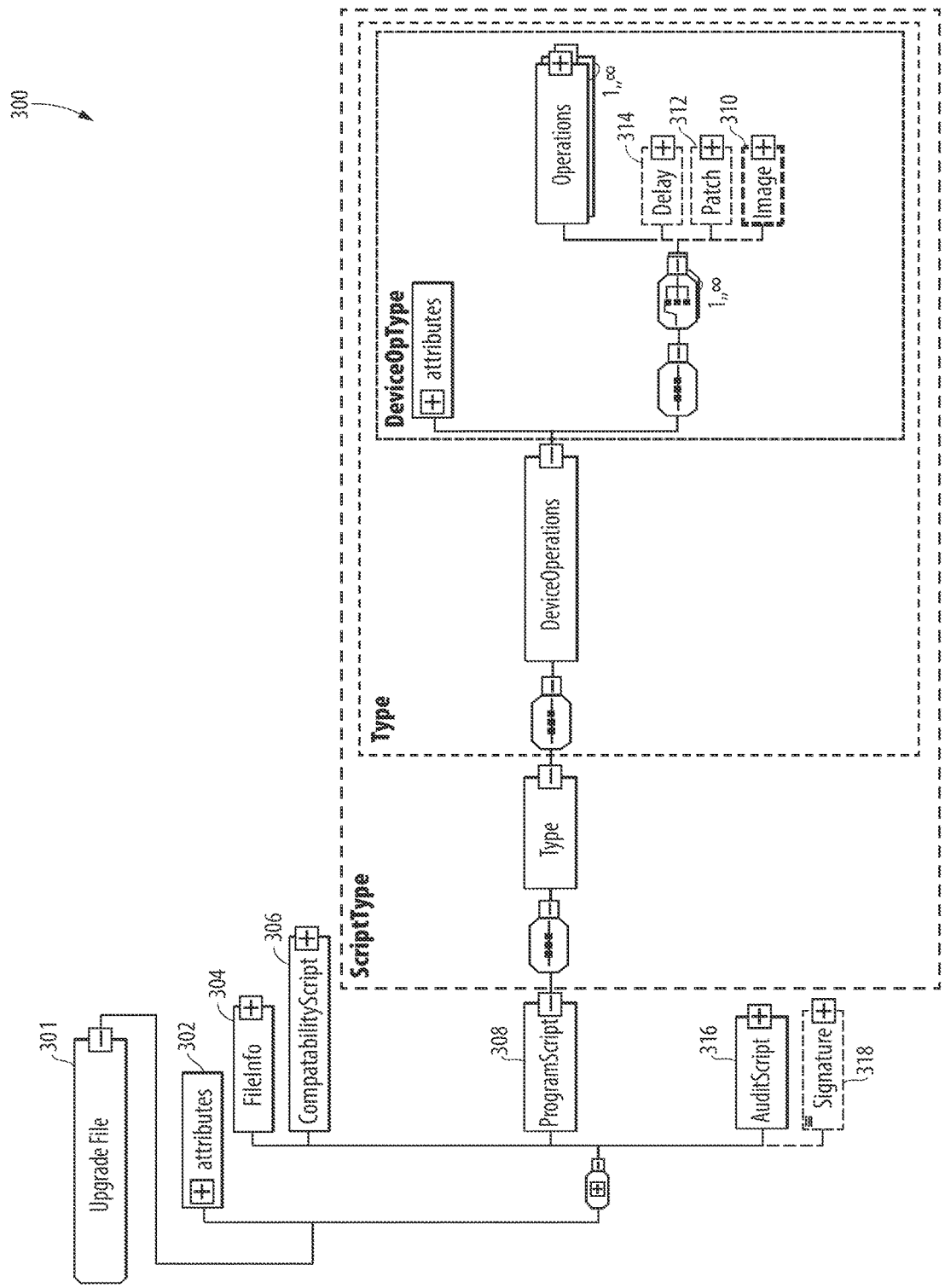
FIG. 3 depicts a generalized endpoint hardware upgrade file 115 schema including a firmware image according to a number of aspects.

As shown in FIG. 3, a target endpoint hardware upgrade file 301 may comprise a schema 300 including a firmware image 314 according to a number of aspects. The target endpoint hardware upgrade file 301 may be received by a piece of target endpoint hardware 108 such as but not limited to a meter 112, and constructed by a piece of intermediary hardware such as a NIC 110 in response to upgrade instructions 117 received from a headend 113. The target endpoint hardware upgrade file 301 may contain metadata and file info 304, compatibility data as well as a compatibility script 306, upgrade payload data such as but not limited to an image element 310, or a patch 312 including instructions on how to modify the presently installed firmware or hardware configuration of the target endpoint hardware 108, as well as program script 308, an audit script 316 so that intermediary hardware such as an NIC 110 may audit the application of the meter configuration file 122 to the meter 112 or metrology board, and signature data. It is contemplated that another device such as a headend 113 or the target endpoint hardware 108 itself may perform an audit and report the result of the audit to the headend 113 via the network. 115.

The schema 300 generated by the headend 113 may define rules to be followed by the target endpoint hardware 108 in qualifying, applying, and auditing the installation of the NIC firmware 116, the meter firmware 118, or target endpoint hardware configuration file 122 against the target endpoint hardware 108. These rules expressed in data may be expressed within the schema 300 in a form such as but not limited to a datagram. Additionally, a program, a configuration or firmware image may be present within the schema as an image element 310. The image element 310 may be in the form of an executable that writes endpoint hardware firmware data to the target endpoint hardware 108. The image element 310 may be to be present in the schema 300 alongside other commands. A compatibility script 306 which may be included in or alongside the schema 300 may contain commands for a NIC 110 to execute, and in most cases, transmit to the target endpoint hardware 108 as data table commands to confirm the compatibility of the target endpoint hardware upgrade file 123. The use of this format for meter firmware 118 compatibility determination is new. A program script 308 included in or alongside the schema 300 may contain commands for the target endpoint hardware 108 to execute, and in some cases to start and finish the programming of the target endpoint hardware upgrade file 123. An audit script 316 included in or alongside the schema 300 may contain commands for the NIC 110 to execute which may represent data table commands that will confirm that the changes embodied in the program script 308 were effective.

Additionally, scripted instructions (not shown) may accompany the input upgrade file 115 or target endpoint hardware upgrade file 123. The scripted instructions may be binary instructions or higher-level programming instructions. For example, the scripted instructions, when executed by an NIC 110, may cause the NIC 110 to (a) test a target endpoint system, such as a meter 112 for compatibility with the target endpoint hardware file to be transferred, (b) process the details of the transfer, and (c) audit the results of the transfer. Such scripted instructions may be executed by the NIC 110 alongside or in a sequence with the upgrade instructions 117, image, hardware configuration, or work instructions communicated to the NIC 110.

Figure 4:
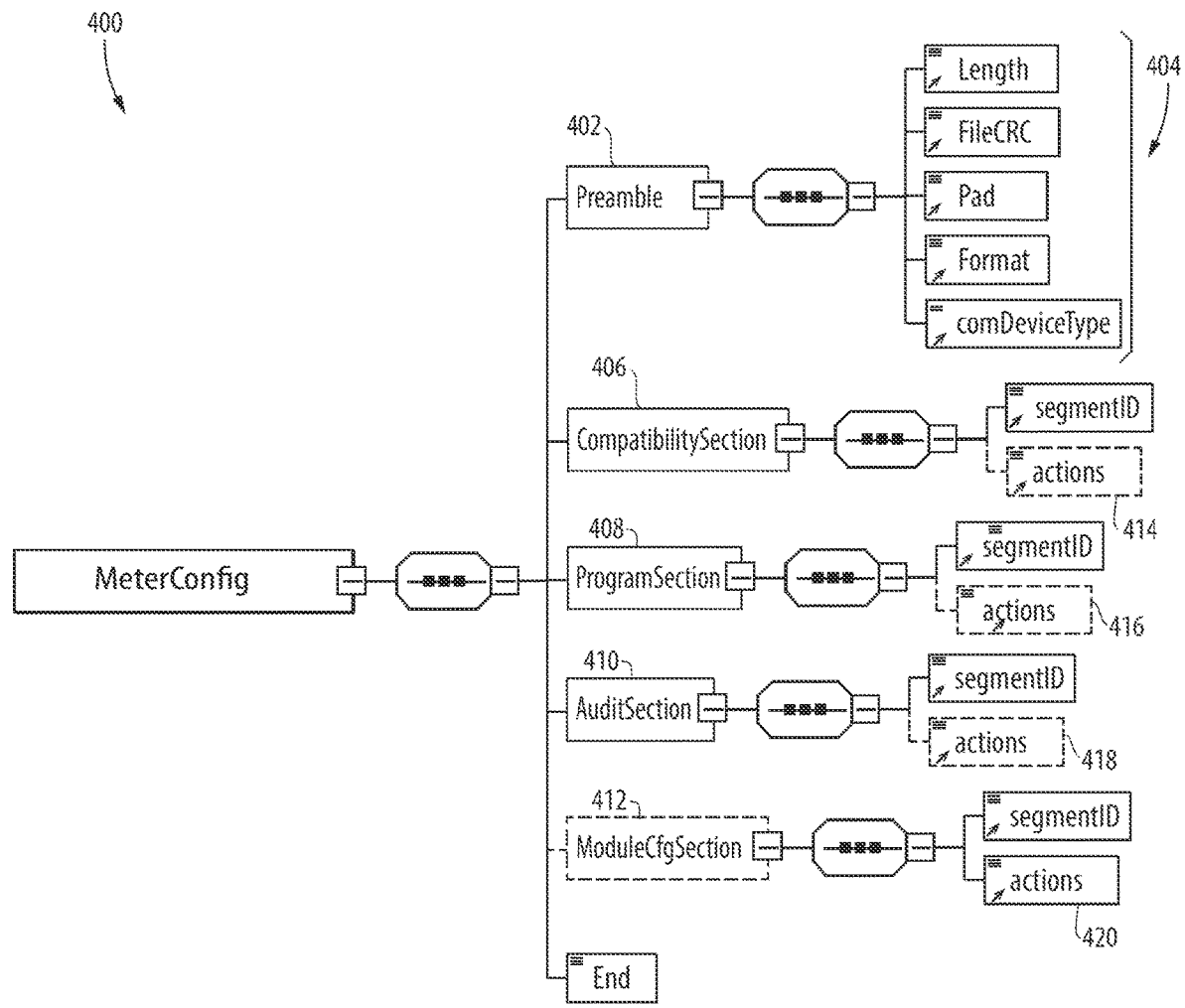
FIG. 4 depicts an endpoint hardware configuration schema according to a number of aspects.

As shown in FIG. 4, a target endpoint hardware configuration schema 400 according to a number of aspects may include a target endpoint hardware configuration file 122. The target endpoint hardware configuration schema 400 may be an executable binary file including datagrams and comprising a preamble section 402, a compatibility section 406, a program section 408, an audit section 410, and a module configuration section 412 and may be executable by a receiving piece of target endpoint hardware 108. The preamble section 402 may contain validation information 404 useful for validating correct receipt of the target endpoint hardware configuration schema 400 such as a byte or bit size length of the target endpoint hardware configuration schema 400, a circular redundancy check or a bit padding section—in the case that the target endpoint hardware 108 configuration is in the form of a file such as a binary executable file, a format indicator, and a receiving device type indicator.

The compatibility section 406, the program section 408, and the audit section 410 of the target endpoint hardware configuration schema 400 may contain scripts, each having separate functions. A compatibility script 414 which may be included in or alongside the target endpoint hardware configuration schema 400 may contain commands for the target endpoint hardware 108 to execute and confirm its own compatibility with the received target endpoint hardware configuration schema 400. A program script 416 which may also be included in the target endpoint hardware configuration schema 400 may contain commands for the target endpoint hardware 108 to execute for purposes such as but not limited to preparing the target endpoint hardware 108 for a change to its current configuration (not shown), and performing the desired changes to its current configuration based on the module configuration section 412 (described below). An audit script 418 included in or alongside the target endpoint hardware configuration schema 400 may contain commands for the target endpoint hardware 108 to execute to confirm that the changes affected by the program script 416 were effective. The module configuration section 412 as shown in this aspect may contain scripts 420 detailing the desired changes to the target endpoint hardware 108 configuration.

Figure 5:
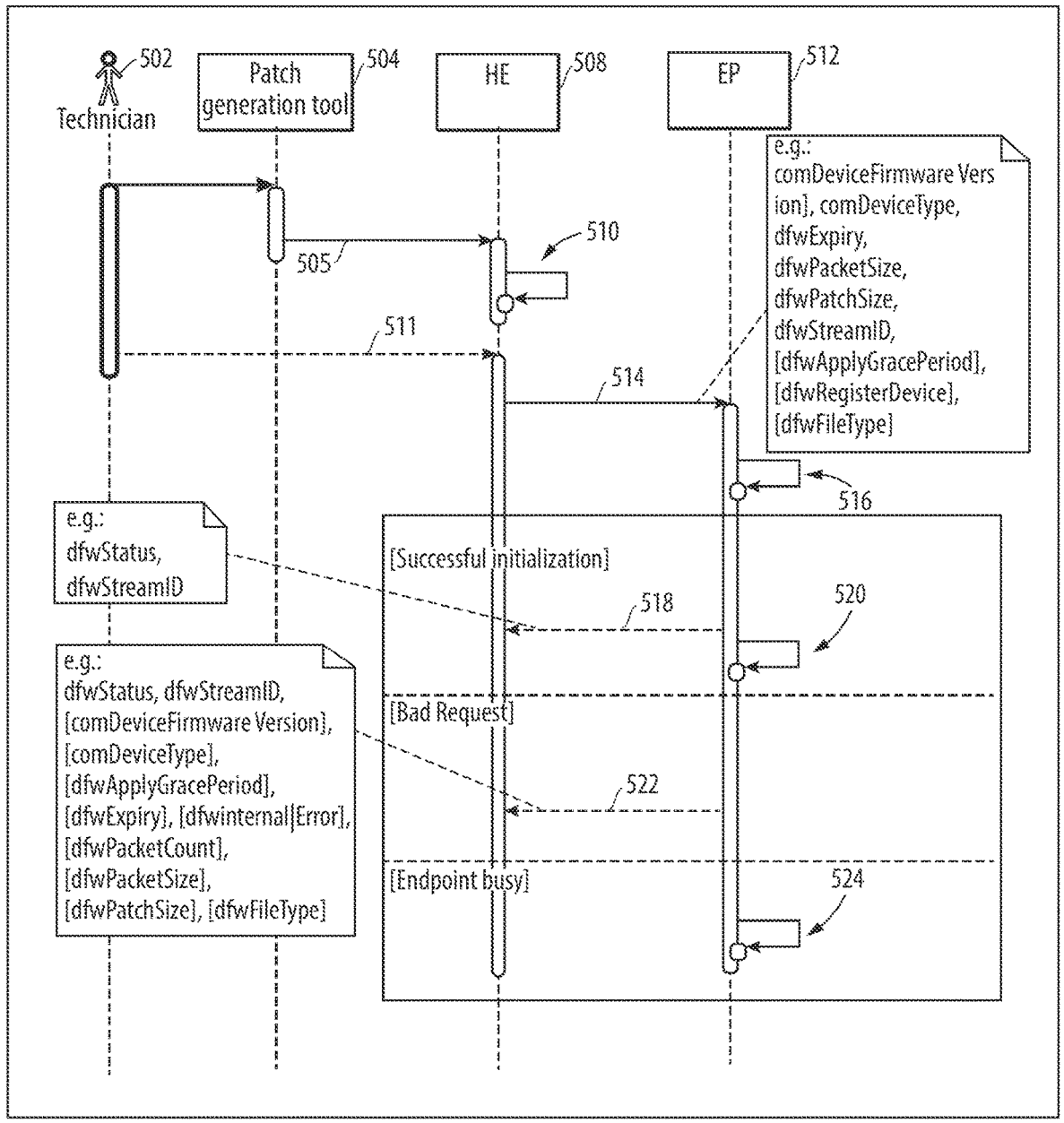
FIG. 5 is a sequence diagram depicting a cooperative workflow involved in communicating an upgrade file from a headend to target endpoint hardware according to a number of aspects.

As shown in FIG. 5, a technician 502 may partake in a process of preparing, selecting, and pushing an upgrade file 505 from a headend 508 to target endpoint hardware 512 according to a number of aspects. The technician 502 may utilize an interface to cause a patch generator 504 to may convert the upgrade file 505 that it receives from the technician 502 into a set of upgrade instructions 506 that inform the target endpoint hardware 108 how to modify itself in order to mirror a firmware image contained in the upgrade file 505 or how to install the firmware image in the upgrade file 505. The patch generator 504 may also ensure that these work instructions are formatted in a structure or file that is acceptable to the headend 508. For example, the patch generator 504 may generate the upgrade instructions 506 and insert them into an XML schema that the headend 508 will accept as input. The patch generator 504 may then transfer the upgrade instructions 506 to the headend 508. The headend 508 may then perform a process 510 of packetizing the upgrade instructions 506 into packets 514 downloadable by an target endpoint hardware 512.

The packets 514 may be held in the memory of the headend 508, in a database, in cloud storage, or some other means of storage. The headend 508 may then make the transfer of these packets 514 to the target endpoint hardware 512 a selectable option to the technician 502 via an interface such as a display on a meter tool. The technician 502 may initiate a download of the packets 514 at a piece of target endpoint hardware 512, such as particular NIC 110, by making such a selection. This selection may cause the meter tool to produce an initiate download command 511. Upon receipt of the initiate download command 511, the target endpoint hardware 512 may perform an acknowledgement 516 of the initiate download command 511, wherein a current status of the endpoint 512 may be assessed, and the syntax and parameters of the initiate download request may be verified by the endpoint 512.

In some cases, the acknowledgement 516 is successful. In such cases, the endpoint 512 begins an initialization 520 in anticipation of downloading the packets 514 from the headend 508 and processing them to produce a target endpoint hardware upgrade file 123. Upon initialization 520, the endpoint 512 may send a successful initialization message 518 to the headend 508. After a sufficient portion of the packets 514 have been downloaded to the target endpoint hardware 512, the target endpoint hardware 512 may begin to follow the upgrade instructions 506 in the received packets 514. The target endpoint hardware's 512 firmware or configuration may thus be updated to a desired hardware state or configuration by this process. In the case that the target endpoint hardware 512 is an NIC 110, the NIC 110 may push the processed packets 514 to target endpoint hardware 512, which may comprise one or more pieces of target endpoint hardware 512.

In some cases, the acknowledgement 516 or initialization 520 is unsuccessful. In cases wherein the download command 511 is bad, the endpoint 512 may send a bad request message 522 to the headend 508 in response to the download command 511. In cases wherein the acknowledgement 516 reveals that the endpoint 512 is busy, the endpoint may continue with its current task 524 and simply drop the download command 511.

Although certain aspects have been described in detail with reference to certain preferred embodiments, variations and modifications exist within the scope and spirit of one or more independent aspects as described.

What is claimed is:

1. A method comprising:
providing input firmware image data to a patch generator;
producing, by the patch generator, a set of upgrade instructions for a piece of target endpoint hardware in a power distribution network based on the input firmware image data, wherein the set of upgrade instructions are constructed and arranged to facilitate a modification of a current firmware installation of the target endpoint hardware based on the input firmware image data;
producing, by the patch generator, formatted upgrade instructions by inserting the set of upgrade instructions into a schema digestible by a headend;
communicating, by the patch generator, the formatted upgrade instructions to the headend;
producing, by the patch generator, upgrade packets by packetizing the formatted upgrade instructions;
communicating, by the patch generator the packets to a network interface card; and,
executing, by the network interface card, the set of upgrade instructions,
wherein the input firmware image data is an image data differential provided by
comparing, by the patch generator, the current firmware installation of the target endpoint hardware to a desired firmware image to produce an image differential; and, producing, by the patch generator, the input firmware image data based on the image differential, wherein the firmware image data is provided by receiving, by the patch generator, a desired firmware image, and producing, by the patch generator, the firmware image data based on the desired firmware image.

2. The method of claim 1, wherein the upgrade instructions are constructed and arranged to facilitate a modification of the current firmware installation of the target endpoint hardware in that the set of upgrade instructions, when executed by a network interface card, produce an upgrade file for a meter.

3. The method of claim 1 wherein the target endpoint hardware is a meter and wherein the patch generator is located at a headend, the method further comprising:

producing, by the network interface card, a target endpoint hardware upgrade file based on the packets, executing, by the network interface card, the instructions; and installing, by the network interface card, the upgrade file to the meter.

4. The method of claim 1, further comprising:

producing, by the patch generator, a set of script instructions for a piece of target endpoint hardware, the script instructions including at least one of a compatibility script, a program script, or an audit script; and, executing, by the target endpoint hardware, the script instructions.

5. A non-transitory, computer-readable medium storing instructions that, when executed by an electronic processor, causes the electronic processor to perform a set of functions via a patch generator, the set of functions to:

receive a firmware image reflecting a desired firmware state for a piece of endpoint hardware;

receive, from a network interface card in a power distribution network, an indication of a current firmware version of the endpoint hardware;

generate instructions, readable by the network interface card, for performing an update to the endpoint hardware based upon at least the firmware image reflecting the desired firmware state;

produce formatted upgrade instructions by inserting the set of upgrade instructions into a schema digestible by a headend;

communicate the formatted upgrade instructions to the headend;

produce upgrade packets by packetizing the instructions;

communicate the upgrade packets to the network interface card, wherein the patch generator is further configured to access firmware image corresponding to the indication of the current firmware version of the endpoint hardware, and wherein the generated instructions are based on a correlation, by the patch generator, of the firmware image reflecting a desired firmware state for a piece of endpoint hardware to the firmware image corresponding to the indication of the current firmware version of the endpoint hardware.

6. The non-transitory, computer-readable medium of claim 5, further configured to:

receive, from a headend, script instructions for execution by a network interface card; and, communicate the script instructions to the network interface card.

7. The non-transitory, computer-readable medium of claim 5, further configured to communicate the firmware image reflecting a desired firmware state for a piece of endpoint hardware to the network interface card in response to failing to receive indication of a current firmware version of the endpoint hardware.

8. The non-transitory, computer-readable medium of claim 5, wherein the indication of the current firmware version of the endpoint hardware is a firmware image of a current firmware installation of the endpoint hardware.

9. A method of transmitting, to a patch generator, detailed compatibility information, modification instructions, auditing instructions, and file building instructions for a file to be transferred to target endpoint hardware comprising:

populating a schema with data representative of binary instructions configured to confirm at least one capability of the target endpoint hardware based at least upon the compatibility information;

populating the schema with data representative of binary instructions configured to perform a modification at the target endpoint hardware based at least upon the modification instructions;

populating the schema with data representative of binary instructions configured to perform an audit of the modification at the target endpoint hardware based at least upon the data representative of binary instructions configured to perform the audit;

populating the schema with data representative of binary instructions configured to build a file to be transferred to the target endpoint hardware;

delivering the schema to a tool that translates the schema into binary instructions for target endpoint hardware;

producing upgrade packets by packetizing the binary instructions;

using the tool to transmit the upgrade packets to a network interface card; and, using the network interface card to receive and execute at least some of the binary instructions.

10. The method of claim 9, wherein using the network interface card to receive and execute at least some of the binary instructions comprises using the network interface card to execute binary instructions pertaining to building a file for the target endpoint hardware such that the file to be transferred to the target endpoint hardware is built by the network interface card.

11. The method of claim 10, further comprising using the network interface card to transfer the file to the target endpoint hardware.

* * * * *